United States Patent Office 3,552,161
Patented Jan. 5, 1971

3,552,161
MILL PROTECTING DEVICE
Howard W. Garbe, Madison, N.J., and Harold S. Moss, Brooklyn, N.Y., assignors to Western Electric Company, Incorporated, New York, N.Y., a corporation of New York
Filed Apr. 26, 1967, Ser. No. 633,885
Int. Cl. B21d 55/00
U.S. Cl. 72—4
14 Claims

ABSTRACT OF THE DISCLOSURE

Upon sensing a dimensional irregularity in rod being rolled from continuously cast bar by a mill, a sensing mechanism operates a switch to stop the mill and to sever and divert further continuously cast bar from the mill. The sensing mechanism is formed of radially movable switch actuating members surrounding the moving rod and spaced from the rod by a predetermined tolerance.

BACKGROUND OF THE INVENTION

In the rolling of materials, such as in rolling continuously cast copper bar into rod, irregularities or nonuniformities are often encountered in rod being advanced through and rolled in the mill. Such irregularities, which may take the form of "cobbles," off-center conditions, protuberances, or bulges in strips or strands of advancing material, can jam the mill rolls and cause damage to the mill and/or the rolled product. A protective device which can sense the presence of cobbles and then function to stop the mill rolls and divert continuously cast bar away from the mill is, therefore, desirable.

Devices are known which detect size iregularities, such as cobbles or bulges, in an advancing material or rod and thereupon operate protecting mechanisms. Often, such known devices require a complex rethreading of the material through the detecting device after the undesirable, irregularity-containing sections of the material have been detected and cut away. This may be due to the use of an axially movable sensing element, through which the iregularity cannot pass. Also, generally characteristic of known detecting devices is the continuous, wear-causing contact of the sensing element with the advancing material. It is desirable to provide a reliable detecting and protecting device which does not require an additional rethreading operation of the material through the device after cutting out undesirable, nonuniform sections and which does not employ the continuous contact of a sensor with the advancing material.

SUMMARY OF THE INVENTION

A cobble sensing and mill protecting device is contemplated by the invention for sensing the presense of undesirable "cobbles" or bulges in continuously cast and rolled rod or other strip or strand material and operating mill protecting mechanisms in response to cobbles detected. The protecting mechanisms include mill stopping, cast bar shearing, and cast bar diverting mechanisms. In order to avoid any complex rethreading operation, the detecting or cobble sensing mechanism employs a plurality of radially separable sensing members through which the advancing rod passes as the presence of cobbles is detected. The sensing members surround and are spaced from the surface of the advancing rod. Any cobble in the rod causes one or more sensing members to move radially to actuate a switch for operating the protective mechanisms. The cobble-containing rod portion may subsequently be advanced past the radially displaced sensing members and removed. The displaced sensing members may, meanwhile, return to their initial positions. No complex rethreading of the rod through an axially movable, fixed inner diameter gaging member is required.

DETAILED DESCRIPTION

Figure 1:
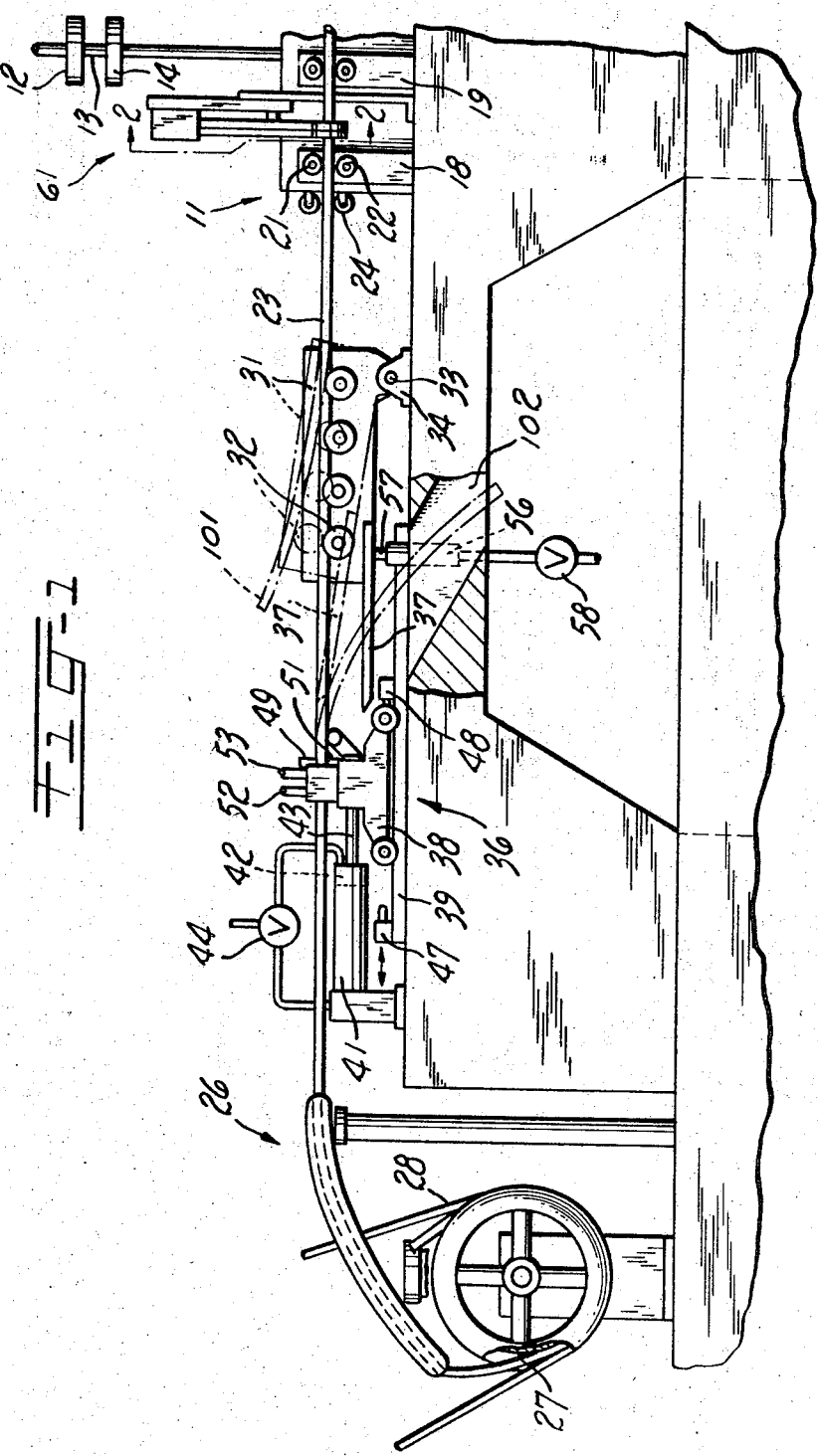
FIG. 1 is a side elevational view, partly in section, of a continuous casting apparatus and a rod rolling mill employing a mill protecting device in accordance with the principles of the invention.

Referring now to FIG. 1 of the drawing, a rolling mill 11 is driven by a motor (not shown) through a clutch 12 having an output shaft 13 for driving the mill. An electrically controlled brake 14 is operable to stop the shaft 13. Energization of a brake solenoid 16 (FIG. 3) holds the brake 14 inactive when the mill is running. Simultaneously, energization of a solenoid 17 (FIG. 3) engages the clutch 12 to drive the mill. The mill 11 may include two or more roll stands 18, 19, etc. Each stand includes a pair of rolls, such as the rolls 21 and 22 of the stand 18, for reducing a dimension of a bar 23 or other strip or strand material which is advanced toward the mill. A pair of pinch rollers 24 may be power-operated to initially feed the bar into the mill. The mill functions to form the continuously cast bar into rolled rod.

The bar 23 is preferably continuously formed by continuous casting apparatus. Exemplary of such apparatus is a mechanism 26 embodying a rotating, grooved casting wheel 27 and traveling band 28, as disclosed in J. A. Bell et al. application Ser. No. 399,140, filed Sept. 25, 1964.

Upon exiting from the continuous casting apparatus 26, the bar 23 is advanced toward the right, as viewed in FIG. 1, by continued operation of the casting apparatus and by the driven rolls 21, 22, etc. of the mill 11. A tilting frame 31 has a plurality of rotatable guiding rollers 32 mounted thereon which normally guide and support the bar during this movement from the continuous casting apparatus to the rolling mill 11.

The frame 31 is trunnioned by a pin 33 in bearing block 34 and is mounted to pivot about the pin 33 out of the line of advance of the bar in a clockwise direction as viewed in FIG. 1 to attain the phantom position shown therein. The pivoting of the frame acts in cooperation with a reciprocal shearing mechanism 36 to divert additional advancing bar 23 away from the mill 11 upon a signal which also acts to deenergize the solenoids 16 and 17 to stop the mill. A rod diverting finger 37 extends from the frame 31 toward the shearing mechanism 36 and the casting apparatus 26.

Figure 3:
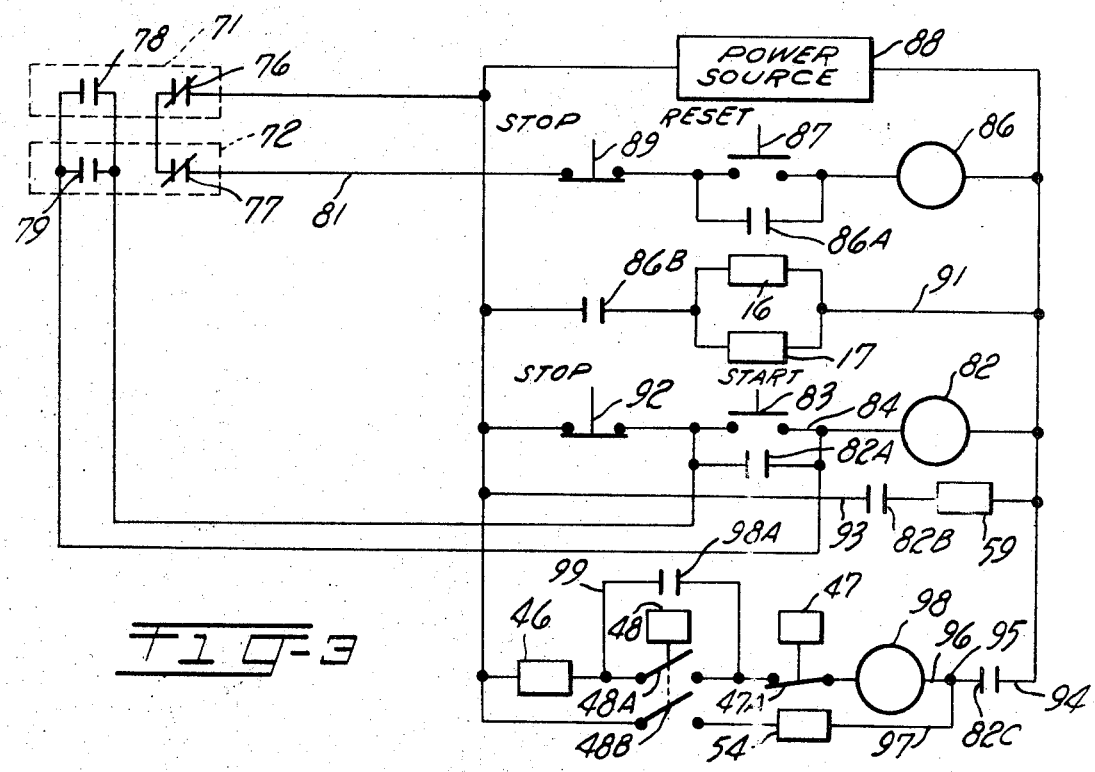
FIG. 3 is a circuit diagram showing a control circuit used in the mill protecting device to operate mill protecting mechanisms upon the cobble sensing mechanism detecting cobbles in the rod.

The shearing mechanism 36 includes a carriage 38 reciprocable on a trackway 39. A pneumatic cylinder 41 encloses a piston 42, the piston rod 43 of which is connected to the carriage 38. Reciprocation of the carriage will occur due to applications of pressurized fluid to alternating sides of the piston 42. A reversing valve 44 is cyclically controlled between operating positions feeding pressurized fluid to different sides of the piston by alternate energization and deenergization of a valve solenoid 46 (FIG. 3). A pair of limit switches 47 and 48 are used to alternately cause energization and deenergization of the valve solenoid to reciprocate the carriage along the trackway.

A movable, fluid-operated shearing blade 49 and a fixed back-up blade 51 are carried by the reciprocable carriage 38. The shearing blade is movable to sever the bar 23 against the back-up blade upon the application of pressurized fluid through a pair of flexible lines 52 and 53. A valve (not shown), operated by a cutter solenoid 54 (FIG. 3), adapts the shearing blade 49 for cyclical operation by controlling the alternated application of pressurized fluid to the lines 52 and 53, similarly to the operation of the valve 44.

The positions of the shearing mechanism 36 and the tilting frame 31 shown in solid lines in FIG. 1 are the normal, rest positions thereof. The carriage 38 of the shearing mechanism 36 is held in its rightmost position by the fully extended piston rod 43, with the limit switch 48 held depressed. The valve 44 is biased to maintain this rest position of the carriage 38 when the solenoid 46 (FIG. 3) is deenergized. The tilting frame rests unpivoted, subject to being moved in a clockwise direction through the operation of a piston and cylinder assembly 56, the piston rod 57 of which supports the frame. A valve 58, controllable by a solenoid 59 (FIG. 3), is operable to apply pressurized fluid to the cylinder for lifting the piston to pivot the frame 31 to the phantom position in FIG. 1. In the normal, solid line position, however, the rollers 32 provide a guiding and supporting path for the bar 23 advancing toward the rolling mill 11.

A mechanism 61 for sensing the presence of undesirable conditions in the form of cobbles, protuberances or bulges in rod being rolled is shown positioned between the roll stands 18 and 19 of the mill 11. This mechanism functions to detect such cobbles between the roll stands and, upon the detection of a cobble, acts to protect the mill by providing the aforementioned signal which alters the operating condition of the solenoids 16, 17, 46, 54, and 59.

Figure 2:
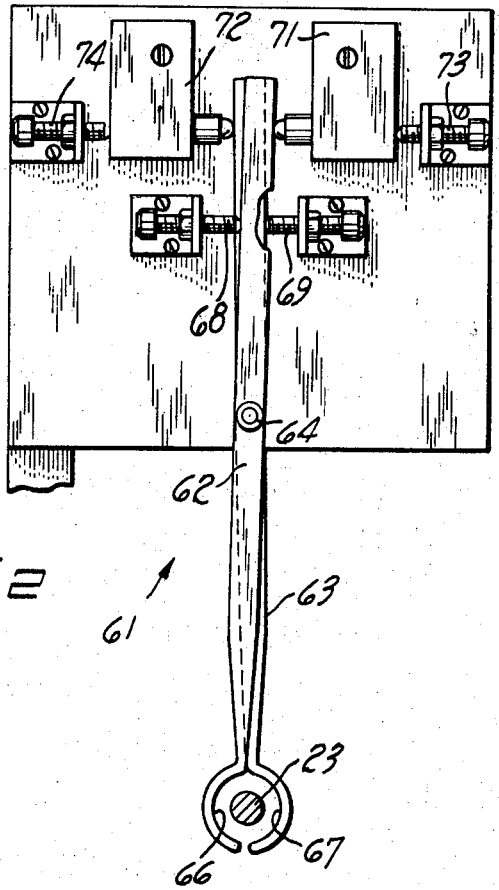
FIG. 2 is an end elevational view, enlarged and partly in section along the line 2—2 of FIG. 1, showing a section of rod passing through a cobble sensing mechanism forming a part of the mill protecting device.

The cobble sensing mechanism 61 is best illustrated in FIG. 2, wherein the rod undergoing rolling is shown advancing in a direction perpendicular to the plane of the drawing. The cobble sensing mechanism includes a pair of movably mounted sensing members or levers 62 and 63 mounted adjacent each other on a common pivot pin 64. Each of the sensing members is pivotally mounted and has its center of gravity located beneath the pivot pin. Thus, each sensing member is urged toward a substantially vertical position by its own weight.

A lower end of each sensing member is preferably of an arcuate or C-shaped configuration. Concave C-shaped surfaces 66 and 67 of the sensing members 62 and 63, respectively, face in opposed directions. A pair of sensing member stop screws 68 and 69 bear against the members 62 and 63, respectively, above the pivot pin 64. The stop screws 68 and 69 combat the natural tendency of the members 62 and 63 to depend from the pivot pin with the C-shaped ends thereof in an overlapping relationship. Instead, the screws each bear against one of the cobble sensing members to fix a rest position of the cobble sensing mechanism wherein the C-shaped ends form a substantially enclosed passageway through which the rod being rolled must advance. This rest position is the condition of the cobble sensing mechanism shown in FIG. 2. Adjustment of the screws 68 and 69 will preset a desired tolerance spacing between the C-shaped ends 66 and 67 and adjacent sections of the initially cobble-free rod 23.

First and second cobble detecting switch assemblies 71 and 72 are respectively associated with the cobble sensing members 62 and 63. These assemblies are so mounted that the upper ends of the cobble sensing members serve to actuate the switches 71 and 72 upon pivoting of the member 62 clockwise, or the member 63 counterclockwise, about the pivot pin 64. Note that such pivotal movement will occur as the C-shaped ends separate radially outwardly and as the members move away from the stop screws 68 and 69. A pair of adjusting screws 73 and 74 are provided for precise positioning of the cobble detecting switch assemblies 71 and 72 contacting opposed sides of the cobble sensing members from the sides contacted by the stop screws. The distances through which the sensing members 62 and 63 must pivot to actuate the switches 71 and 72 may be regulated by turning the adjusting screws 73 and 74.

Referring next to FIG. 3, a control circuit for use with the cobble sensing mechanism 61 is illustrated. The circuit of FIG. 3 includes two normally closed contacts 76 and 77 and two normally open contacts 78 and 79. The normally closed contact 76 and the normally open contact 78 form part of the switch 71 which is actuated by the cobble sensing member 62. The normally closed contact 77 and the normally open contact 79 form part of the switch 72 which is actuated by the cobble sensing member 63. The normally closed contacts 76 and 77 are connected in series in a line 81. The normally open contacts 78 and 79 are coupled in parallel across another normally open contact 82A and across a normally open "Start" switch 83 in a line 84.

In the operation of the apparatus, a mill drive relay 86 (FIG. 3) is initially energized by pressing a normally open "Reset" button 87 in the line 81. Energizing current is supplied to the relay 86 from a power source 88 through the normally closed contacts 76 and 77, a normally closed "Stop" button 89 and the pressed "Reset" button 87. A holding path bypassing the "Reset" button is also provided by the closing of a normally open holding contact 86A operated by the mill drive relay 86. A normally open mill drive contact 86B is also closed by the relay 86 to provide a current path in a mill drive circuit 91 connected across the source 88. The mill drive circuit, upon the closing of the contact 86B energizes the mill drive clutch solenoid 17 to cause an initial engagement of the clutch 12 and also energizes the solenoid 16 to deactivate the mill brake 14. Thus, the mill is driven through the engaged clutch with the brake held deactivated by the energized solenoid.

Assume now that the continuous casting apparatus 26 (FIG. 1) is functioning to cast and continuously advance an uninterrupted, uniform bar 23 toward the rolling mill 11. The bar advances past the presently inactive shearing mechanism 36, along the guiding rollers 32 of the tilting frame 31, and into the mill 11. The bar then passes between the roll stands 18 and 19 as it is rolled into rod and through the gap between the cobble sensing members 62 and 63 of the cobble sensing mechanism 61. Assuming that there is no undesirable cobble or bulge in the rolled rod, no protective signal is produced by the cobble sensing mechanism and the mill is continuously driven to roll the bar into rod. Driving power is supplied to the mill through the mill drive clutch 12, since the mill drive contact 86B (FIG. 3) is presently closed. The holding contact 86A is closed and the mill drive relay 86 is held energized. The contacts 76 and 77 remain closed, while the contacts 78 and 79 remain open.

This normal operating condition is maintained as long as the mill drive relay 86 remains energized and a shear control relay 82 in the line 84 remains deenergized. The mill drive relay will be deenergized only upon current through the line 81 being interrupted, either by the manual pushing of the "Stop" button 89 or the opening of one of the normally closed contacts 76 or 77 due to the occurrence of a cobble or bulge moving a cobble sensing member 62 or 63 outwardly to actuate the associated switch 71 or 72. The line 84 is coupled through a normally closed "Stop" button 92 across the power source 88. The shear control relay 82 will be energized only upon the manual pushing of the "Start" switch 83 or the cobble-caused closing of one of the normally open contacts 78 or 79.

Assume, next, that a cobble or bulge occurs in the rolling mill 11 between the roll stands 18 and 19 (FIG. 1). The size of the cobble exceeds the predetermined tolerance. As the cobble reaches the sensing mechanism 61, one or both of the cobble sensing members 62 or 63 (FIG. 2) is contacted by an adjacent section of the rod. The sensing member is pivoted about the pin 64 to move radially outwardly away from the rod. The pivoting of the sensing member actuates the associated switch 71 or 72. Assume, for example, that the switch 71 is actuated by pivotal movement of the sensing member 62. Thus, the normally closed contact 76 (FIG. 3) is opened and the normally open contact 78 of this switch is closed.

The opening of the contact 76 deenergizes the mill drive relay 86, causing the opening of the contacts 86A and 86B. Upon the opening of the contact 86B, the mill drive clutch solenoid 17 and the mill brake deactivating solenoid 16 are both deenergized. The rolling mill 11 is, therefore, quickly brought to a stop by operation of the mill brake 14 with the clutch 12 now disengaged.

Meanwhile, the closing of the contact 78 energizes the shear control relay 82 through the line 84 across the power source 88. The closing of the normally open contact 82A is, controlled by the relay 82. Contact 82A is, thus, now closed to provide a holding path maintaining the relay 82 energized. The energization of the shear control relay also closes a normally open contact 82B in a line 93 which couples the solenoid 59 for operating the tilting control valve 58 associated with the frame 31 across the power source 88. The energization of the relay 82 further closes a normally open contact 82C in a line 94 between a junction 95 and one terminal of the power source 88.

Two lines 96 and 97 are coupled in parallel between the junction 95 and the other terminal of the power source 88. The line 96 has connected in series therein the solenoid 46 for operating the shearing mechanism reciprocating control valve 44 (FIG. 1), a normally biased open contact 48A of the limit switch 48 (FIG. 1), a normally closed contact 47A of the limit switch 47 (FIG. 1), and a relay 98. A line 99, bridging the normally open contact 48A, has therein a normally open contact 98A closable by the relay 98. The line 97 has connected in series therein the solenoid 54 for controlling severing operations of the shearing blade 49 (FIG. 1) and a second normally biased open contact 48B of the limit switch 48 (FIG. 1) ganged with the normally open contact 48A.

The shear control relay 82 is now energized and the contacts 82B and 82C are, thus, closed. Also, the carriage 38 is held in its fully extended, rightmost rest position of FIG. 1, holding the limit switch 48 depressed and thereby maintaining the contacts 48A and 48B closed. Since the contact 47A is also closed, current now flows through the lines 93, 94, 96 and 97. The solenoids 46, 54, and 59, and the relay 98 are all energized, the energized relay 98 holding the contact 98A closed.

The energization of the solenoid 54 causes pressurization of one of the lines 52 and 53 to impart a rapid downward cutting stroke to the fluid-operated shearing blade 49 on the carriage 38. This results in severing the bar 23 against the back-up blade 51. Immediately thereafter, the energization of the solenoid 59 causes operation of the valve 58 to deliver pressurized fluid to the piston and cylinder assembly 56. The tilting frame 31 is, thus, pivoted clockwise, lifting a nonadvancing segment 101 of the bar 23, located to the right of the shearing mechanism 36, upwardly away from the still-advancing bar issuing from the continuous casting apparatus 26. The advancing bar is, meanwhile, deflected downwardly by the diverting finger 37 to exit through a chute 102 to a location from which it may subsequently be recovered. The tilting frame 31 will remain in the phantom position of FIG. 1 as long as the relay 82 continues energized to maintain the contact 82B closed.

The energization of the solenoid 46, meanwhile, causes reciprocation of the carriage 38 to commence. The valve 44 is actuated to admit pressurized fluid into the cylinder 41 to the right of the piston 42, simultaneously exhausting fluid from the left of the piston. As the carriage begins to move to the left, the limit switch contacts 48A and 48B attain an open position, to which they are biased. Cutting operation of the shearing blade 49 is stopped by the deenergization of the solenoid 54. However, since the relay 98 holds the contacts 98A closed, the solenoid 46 remains energized from the junction 95 through the lines 96 and 99. The carriage 38 continues to move to the left until the limit switch 47 is operated to open the contact 47A.

At the leftmost limit of the travel of the carriage 38, the contact 47A is opened by the carriage striking the limit switch. The solenoid 46 is deenergized and the valve 44 is deactivated, returning to the original position to which it is biased. The left side of the piston is now pressurized and the piston 42, the piston rod 43, and the carriage 38 to move back toward the right. Upon the moving of the carriage away from the limit switch 47, the contact 47A returns to its normally closed position and the carriage 38 is in condition to reverse to move to the left once again when the limit switch 48 is again engaged with the contact 82C closed.

The closing of the contacts 48A and 48B of the limit switch 48 by the carriage 38, again attaining its FIG. 1 position, causes the reciprocation of the carriage to continue, with the shearing blade 49 once again severing the bar 23 at this rightmost end of the travel of the carriage. A severed bar segment falls through the chute 102.

The shearing mechanism 36 continues to operate to cut the advancing bar issuing from the continuous casting apparatus 26 into segments. This mill 11 remains stopped and the frame 31 tilted upwardly. This condition continues as long as the relay 82 continues energized and the relay 86 continue deenergized. An attending operator may, meanwhile, investigate the cause of the cobble, cut out and remove the cobble, and make any necessary adjustments in the functioning of the continuous casting apparatus or the rolling mill. Upon removal of the cobble, the cobble sensing members 62 and 63 will attain their initial FIG. 2 positions into which they are urged by their own weight. The setting of the stop screws 68 and 69 maintains the sensing members 62 and 63 properly positioned against the switches 71 and 72, respectively.

To reset the apparatus for further rolling by the mill 11, the attending operator need only press the "Stop" button 92 in the line 84 and the "Reset" button 87 in the line 81. These two buttons may, of course, be replaced by a single ganged switch.

The pressing of the "Stop" button 92 deenergizes the shear control relay 82, which will continue deenergized assuming that no cobble is now sensed and the contacts 78 and 79 are, thus, open. Deenergization of the shear control relay causes the contacts 82A, 82B, and 82C to open. The tilting frame 31 returns to its downward position to support the advancing bar 23 once again on the guide rollers 32. The shearing mechanism 36 returns to its rightmost position (in FIG. 1), stops reciprocating, and stops cutting.

Again assuming that no cobble is now sensed, the contacts 76 and 77, therefore, being closed, the pressing of the "Reset" button 87 energizes the mill drive relay 86. The holding contact 86A and the mill drive contact 86B are closed. The solenoids 16 and 17 are energized, so that the mill brake 14 is released and the clutch 12 is engaged to drive the mill. The advancing bar 23 enters the mill 11 through the driven pinch rolls 24 and is fed between the cobble sensing members 62 and 63 as rolling recommences. Rolling will again continue until a cobble is sensed in the rod being rolled or the "Stop" button 89 in the line 81 is pressed.

Obviously, additional cobble sensing mechanisms may similarly be used as protective devices at other points along the path of the advancing bar or rod. Additional associated cobble detecting switch assemblies similar to the switches 71 and 72 would each have one normally closed contact connected into the line 81 and one normally open contact coupled across the "Start" button 83 in the line 84. The additional cobble sensing mechanisms may protect the rolls of any additional stands or may sense the presence of any cobbles, protuberances, bulges, or kinks in the bar entering the first stand or in the rod exiting from the last stand. Oversized rod may be detected at the exit end of the rolling mill by an appropriately positioned sensing mechanism of similar type.

It is to be understood that the above-described apparatus is simply illustrative of one embodiment of the invention. Many modifications may be made without departing from the invention. By way of example only, the principles of the invention include the use of generally similar devices in any other forming apparatus, such as a wire drawing apparatus, wherein a material is advanced through a restricted area. The cobble detecting mechanism may be used as an indicating mechanism with any strand material. Moreover, more than two sensing members or feelers may be used to form each sensing mechanism surrounding the advancing rod or material, the sensing members being mounted in any suitable manner, such as the mounting arrangement of the iris diaphragm of a camera. Alternative construction may also be used in the shearing and bar diverting mechanisms.

What is claimed is:

1. In an apparatus for detecting protuberances on an advancing strip:
   a plurality of sensing members,
   means movably mounting said members for movement in a plane transverse to the longitudinal axis of the advancing strip,
   means for positioning portions of said members about said advancing strip to be engaged and moved by a protuberance on said strip,
   means for interrupting the advance of the strip, and
   means operated by movement of any of said members for actuating said interrupting means.

2. In apparatus which includes means for advancing a material and means for driving the material advancing means, the improvement which comprises:
   a plurality of radially movable means adjacent and normally spaced from said advancing material and responsive to contact with the advancing material for moving radially outwardly, and
   means responsive to outward movement of any of said radially movable means for interrupting driving of the material advancing means by the driving means.

3. Apparatus as set forth in claim 2 wherein said interrupting means comprise switching means and wherein said radially movable means comprise a plurality of actuating members each having a surface portion mounted normally spaced from the advancing material by a predetermined tolerance, and means mounting said actuating members to move radially to actuate the switching means to interrupt driving of the material advancing means upon contact of a member by the advancing material.

4. In a mill for rolling rod advancing thereinto:
   first sensing means mounted normally spaced from said advancing rod adjacent one section thereof for moving outwardly from the rod upon being contacted by an outwardly bulging portion of the rod,
   second sensing means mounted normally spaced from the advancing rod adjacent another section thereof for moving outwardly from the rod upon being contacted by an outwardly bulging portion of the rod, and
   mill protecting means responsive to outward movement of either of the sensing means for interrupting the advance of rod into the mill.

5. A rod rolling mill as set forth in claim 4, including a source of power and a power supply line for driving the mill:
   wherein said mill protecting means comprise normally closed contacts in said line, and
   wherein said first and second sensing means comprise actuating members mounted to open the normally closed contacts by said outward movement to interrupt the supply of power to the mill.

6. In an apparatus for continuously casting bar and rolling the bar into rod, including a continuous casting mechanism and a driven rolling mill,
   sensing means including a plurality of outwardly separable members substantially surrounding said rod being rolled and responsive to the presence of predetermined conditions in adjacent portions of the rod for indicating said presence by outward separating movement of the members,
   means responsive to outward movement of said members for interrupting the drive of the rolling mill, and
   means responsive to outward movement of said members for diverting bar subsequently continuously cast by the casting mechanism away from the rolling mill.

7. In a rolling mill driven by a motor, a system for preventing damage to the rolling mill caused by irregularities in the shape of a material to be rolled, which comprises:
   a first pivotally mounted irregularity detecting member positioned adjacent one section of the material to be rolled,
   a second pivotally mounted irregularity detecting member positioned adjacent an opposite section of the material to be rolled,
   a first switch positioned to be operated by pivotal movement of said first irregularity detecting member,
   a second switch positioned to be operated by pivotal movement of said second irregularity detecting member, and
   means responsive to the operation of at least one of said switches for interrupting the driving of said rolling mill by said motor.

8. In a device for detecting a protuberance on an advancing strand:
   a first sensing member having a C-shaped end,
   a second sensing member having a C-shaped end,
   means for pivotally mounting said first and second members to depend in a vertical direction with the openings of said C-shaped ends facing each other and with the weight of said ends urging said C-shaped ends into overlapping relation,
   adjusting means for moving said members relative to each other to move said C-shaped ends toward and away from each other to vary the gap therebetween to accommodate the advancing strand; and
   detecting means positioned to be operated by movement of either or both of said members in response to an engagement of a protuberance on said advancing strand with either or both of said C-shaped ends within said gap.

9. In combination with the protuberance detecting device of claim 8:
   means for continuously casting and advancing strand material,
   a driven rolling mill,
   means for guiding the advancing strand material between the continuous casting means and the rolling mill, and through the gap between the C-shaped ends of the first and second sensing members,
   means responsive to operation of the detecting means for interrupting the drive of the rolling mill, and
   means responsive to operation of the detecting means for diverting subsequently cast material away from the rolling mill.

10. In combination with apparatus as set forth in claim 2;
    means for continuously casting the material as a strand and directing the strand toward said material advancing means; and
    means responsive to outward movement of any of said radially movable means for cutting the strand of material directed toward said material advancing means.

11. In apparatus as set forth in claim 3;
said mounting means mounting said members pivotally depending in a generally vertical direction.

12. A device for detecting flaws such as protuberances in a strand comprising, in combination:
support means;
a pair of plates each having a free edge portion adjacent a free edge portion of the other plate, said plates being mounted on said support means movable between an operating position in which said edge portions define a strand passage therebetween having a cross-section larger than that of said strand, but smaller than that of a thickened portion thereon, and a deflected position;
means for yieldably maintaining said plates in said operating position, said plates moving from said operating position to said deflected position when a thickened portion of said strand engages said free edges; and
quality control means cooperating with at least one of said plates and arranged to be actuated when the latter moves from said operating position to said deflected position.

13. Device according to claim 12, wherein said quality control means comprise a strand cutting means which is actuated whenever at least one of said plates is moved to said deflected position.

14. Device according to claim 12, wherein said quality control means include an electric circuit, at least one contact in said circuit and co-operating with at least one of said plates to be closed thereby when said plate is moved to said deflected position.

References Cited
UNITED STATES PATENTS 2,637,115   5/1953   Watson _____ 33—147X
3,166,172   1/1965   Kelsey et al. _____ 33—147X MILTON S. MEHR, Primary Examiner U.S. Cl. X.R.

33—147; 72—10, 203; 226—43